US006059911A

United States Patent [19]

Kroeze

[11] Patent Number: 6,059,911

[45] Date of Patent: May 9, 2000

[54] METHOD AND APPARATUS FOR FORMING A HONEYCOMB-SHAPED CORE FOR HONEYCOMB PANELS

[75] Inventor: Hendrik Jozef Kroeze, AJ Albergen, Netherlands

[73] Assignee: Besin B. V., Netherlands

[21] Appl. No.: 08/860,951

[22] PCT Filed: Jan. 8, 1996

[86] PCT No.: PCT/NL96/00011

§ 371 Date: Aug. 28, 1997

§ 102(e) Date: Aug. 28, 1997

[87] PCT Pub. No.: WO96/21554

PCT Pub. Date: Jul. 18, 1996

[30] Foreign Application Priority Data

Jan. 9, 1995 [NL] Netherlands ............................ 9500039

[51] Int. Cl.[7] ............................ B29C 73/06; B32B 31/04

[52] U.S. Cl. ............................ 156/197; 156/264; 156/548

[58] Field of Search ..................................... 428/116, 118; 156/197, 548, 264, 291, 549

[56] References Cited

U.S. PATENT DOCUMENTS

| | | | |
|---|---|---|---|
| 3,218,217 | 11/1965 | Geschwender | 156/548 X |
| 3,535,190 | 10/1970 | Loomer et al. | 156/548 |
| 3,713,954 | 1/1973 | Clark | 156/548 |
| 3,979,252 | 9/1976 | Hoyt | 156/512 |
| 4,992,132 | 2/1991 | Schmidlin et al. | 156/498 |
| 5,482,750 | 1/1996 | Colson et al. | 428/12 |

FOREIGN PATENT DOCUMENTS

| | | |
|---|---|---|
| 0347729 | 12/1989 | European Pat. Off. . |
| 1265535 | 10/1961 | France . |

*Primary Examiner*—Deborah Jones
*Assistant Examiner*—Stephen Stein
*Attorney, Agent, or Firm*—Thomas, Kayden, Horstemeyer & Risley

[57] ABSTRACT

A core has honeycomb-shaped cells in rows with sides adhered to each other by glue. All the glue adhering all the cells of at least one of the rows to the cells of a next of the rows is in two glue strips that are spaced from each other.

13 Claims, 3 Drawing Sheets

METHOD AND APPARATUS FOR FORMING A HONEYCOMB-SHAPED CORE FOR HONEYCOMB PANELS

BACKGROUND OF THE INVENTION

The invention relates to a method for forming a honeycomb-shaped core, which is suitable for being included in a honeycomb panel for example, wherein webs or plates of deformable material, in particular cellulose material such as, for example, paper or cardboard, are provided with a number of parallel glue strips and then bonded onto each other and pressed, wherein the glue strips for two plates which possibly originate from said webs, to be successively mounted onto each other, are disposed in a laterally mutually staggered manner, in order to enable the formation of honeycomb cells when the strips which are cut from a number of plates glued to one another are pulled off each other. Generally, for reasons of efficiency, the honeycomb cells have adhering sides which are smaller than the bridging sides of the cells which extend between the plates or strips.

If a large number of plates, for instance 200, are bonded to one another in a stack in this manner, this stack is pressed together and is then cut into transverse bands. These stacks of bands each form a honeycomb core, which, after having been drawn out can, for example, be included in the inner door of a house.

Applying the glue, such as potato starch glue, takes place in a cold state with the help of glue rollers which rotate through a glue bath and transfer the desired quantity of glue onto the plate led past. The glue roller is provided with ribs extending in circumferential direction, which are spaced at a distance from one another which corresponds to the desired lateral distance between the glue strips which are to be applied to the plate.

Applying glue strips preferably takes place in such a way that for two plates which originate or otherwise from respective webs and which are to be mounted onto each other, the glue strips of the one plate will be disposed in a laterally staggered manner with respect to the glue strips of the other plate. This is achieved either by shifting successive plates laterally over the desired mutual distance, use being made of a stationary glue roller, or by using two glue rollers mounted in parallel processing paths or consecutively in one processing path, the ribs or comparable glue contact means of which being arranged over that distance in a laterally mutually displaced manner.

When carrying out the known method it has appeared that glue remains on the ribs or comparable means and on the glue roller, owing to which the glue contact area with the webs or the plates increases in the course of time, so that the glue strips get wider and/or more irregular. If this is to be avoided, then regular cleaning of the glue rollers is necessary, which entails a loss of production time and increases labour costs.

The glue strips have a lateral dimension such that they glue successive plates onto each other along the complete adhering sides of the hexagonal cells, for instance with a dimension of 12 mm for honeycomb cells having a distance between opposite adhering sides of 25 to 37 mm in the honeycomb core to be formed. As a consequence of the manner of applying the glue, the glue strips are, however, irregular and the width thereof varies within a range of 10–17 mm. Because of this the cells too will be irregularly shaped and more plate material will be needed for a honeycomb having a desired length dimension. Because of the glue sticking to the ribs, successive plates and the strips cut from them will be adhered to one another over larger areas in a stack, forming a honeycomb core, as a result of which the achievable stretched a length of that stack will be reduced and the efficiency will consequently be decreased. Moreover, glue is spilled.

SUMMARY OF THE INVENTION

An object of the invention is to provide a method of the kind mentioned in the preamble, with which the glueing and production process for the honeycomb core is controlled in a better way.

According to the invention for this purpose glue strips are applied with the help of glue spout nozzles. By applying glue by means of glue spout nozzles an accumulation of glue remains on glue supplying surfaces is avoided, which would lead to enlargement of the contact surface and could result in irregularly glued surfaces of the plates. The glue is dosed in accurately controlled quantities through an opening of the spout nozzles which is at least almost directly in contact with the plate material. With the glue spout nozzles glue can be dispensed in a constant, regular way.

According to a further development of the method of the invention glue strips are applied, each of which is composed of two transversely mutually spaced glue tracks. Their edges facing away from each other are spaced at a distance in the order of magnitude of the adhering side of a honeycomb cell to be formed. The so-called glue strips are thus reduced to areas which are really necessary to realize honeycomb cells in the honeycomb core to be formed. As a result successive plates are only adhered to one another at the position of the areas adjacent the desired corners of the cells, which suffices for the formation of honeycomb cells when the bands in said stacks are to some extent pulled away from each other.

If obtaining regular-hexagonal honeycomb cells in the honeycomb core is desired, it is preferable that the distance between two laterally adjacent glue tracks, of which the one is applied on the one plate and the other on the plate to be placed thereon, at least almost corresponds to the desired bridging side of a honeycomb cell.

The glue tracks are arranged on a plate preferably at a centre-to-centre distance of approximately 7 to 8 mm from each other. Then, the width of the glue tracks can be limited to approximately 2 to 4 mm in lateral direction. The height can be 1 mm or even less.

As a result of the reduced use of glue a lower water content of the glued plates than was the case up until now is also achieved. For example, paper usually has a water content of approximately 8%, the potato starch glue has a water content of approximately 80% and the glued plate stack has a water content of approximately 14–18%. Because of the reduced size of the glue tracks according to the invention, a water content of the glued plate stack is achieved which does not exceed 10–12%. Owing to this the plates are less susceptible to irreversible deformation and breakage than was the case up until now and they need less drying. When glueing plates for honeycomb cores many glue tracks, possibly as many as 60, have to be appplied adjacent one another. The apparatus for use when carrying out the method according to the invention comprises for that purpose a glue station which is to be located above the plates or webs for use in the honeycomb cell and has a series of glue spout nozzles arranged laterally adjacent one another and a primary glue supply means therefor, in which the glue spout nozzles are connected to the primary glue supply means in groups via secondary glue supply means, in which the secondary glue supply means are provided with selectively operable valves for passing glue or otherwise, with which adjustment can be made to changed plate widths. The primary glue supply means is preferably provided with a selectively operable glue pressure regulator.

In addition, it is preferable if means are available for measuring the velocity of the plates led past the glue station, the glue pressure regulator being operable in response to the measuring data of the velocity measuring means. Thus, the occurrence of too large irregularities in the size of the glue tracks in the longitudinal direction thereof as a result of unforeseen (temporary or brief) changes in the plate velocity is avoided.

In addition, it is preferable if, within each group of glue spout nozzles, the glue spout nozzles are connected to the secondary glue supply means via tertiary glue supply means, in which the tertiary glue supply means are formed as a series of glue supply tubes, which are parallely arranged and are at least almost equally dimensioned. By doing so it is ensured that within each group the same glue flow is dispensed by the spout nozzles located therein.

BRIEF DESCRIPTION OF THE DRAWING

The invention will now be described in more detail on the basis of the details shown in the accompanying drawings.

DESCRIPTION OF EMBODIMENTS

Figure 1:
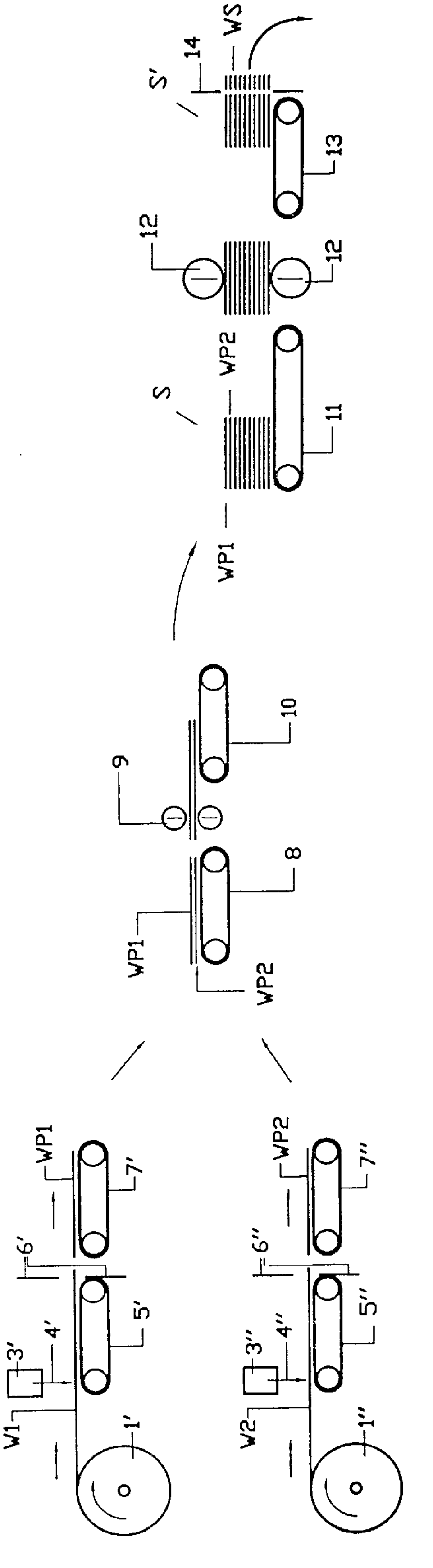
FIG. 1 shows a schematic representation of a production process for honeycomb cores according to the invention.

In the schematic representation according to FIG. 1 two rollers 1' and 1" can be seen, to which webs of paper or cardboard, respectively, are rolled, from which webs the plates for the strips for the honeycomb core originate. The rollers 1' and 1" are arranged parallely and on rotation they supply paper webs W1 and W2, respectively. The webs W1 and W2 are led past glue stations 3' and 3", respectively, where, via the glue spout nozzles 4' and 4", in a manner corresponding to the invention, thin, parallel glue tracks extending in longitudinal direction of the web are applied onto the upper surface of the webs W1 and W2. The webs W1 and W2 are supported by conveyor belts 5' and 5' and are led by them to first cutting stations 6' and 6", respectively, where the webs W1 and W2, which are provided with the glue tracks, are cut to suitable lengths to panels WP1 and WP2, respectively.

It will be understood that the glue stations can also be arranged in an alternative manner at a location downstream from the cutting stations, in which case the glue tracks will be applied on the plates already cut to length. However, this makes no difference for the method according to the invention.

The cut panels WP1 and WP2 are supported by conveyor belts 7' and 7", respectively, and then delivered, which is shown in a schematic way with arrows, to subsequent, common conveyor belt 8, such that at every plate WP2 a plate WP1 arrives. These plates WP1 and WP2 are led successively and in pairs through a first press roller assembly 9 to conveyor belt 10. In addition, the upper press roller is provided with circumferential grooves which coincide with the glue tracks on plate WP1, so that the latter are not disturbed during pressing. The pair of plates WP1 and WP2 bonded in this way is then delivered by conveyor belt 10 to a stack S on conveyor belt 11. The stack S consists of a series of plate pairs WP1 and WP2. With their lower surface the plates WP2 adhere to the glue tracks which are applied to the upper surface of an underlying plate WP1.

The stack S, if the latter has 200 plates, for instance, is led by the conveyor belt 11 to a second pressing roller assembly 12, where the pairs of plates are firmly adhered to each other by exerting pressure. The resulting compressed stack S' is then led via conveyor belt 13 to a second cutting station 14, where the stack is held by means not shown during cutting and is each time moved forward at a suitable pace, in the course of which after each cutting action a stack WS of bands bonded to one another is obtained, which stack, when extended, takes the shape of a honeycomb core.

Figure 2:
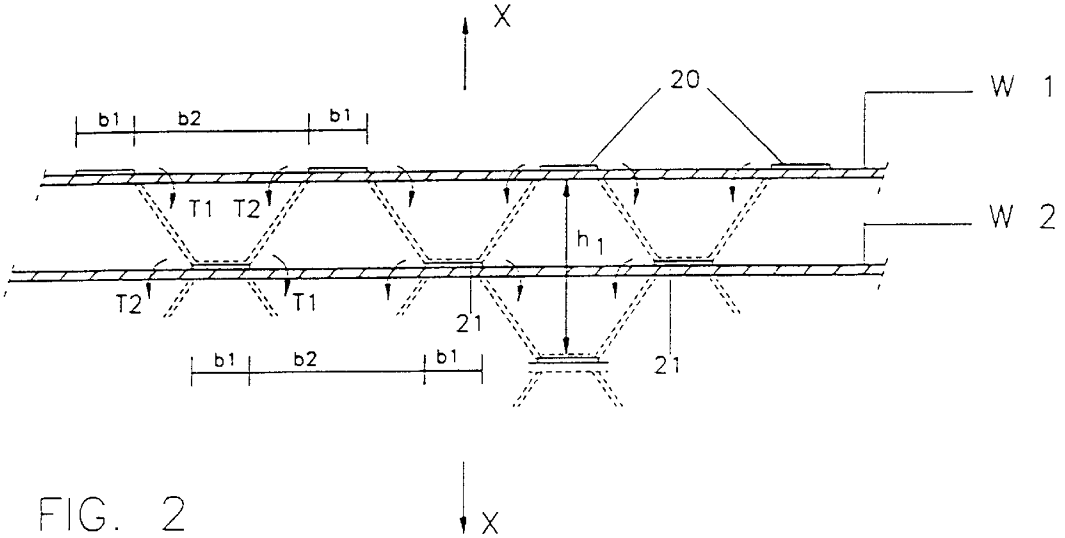
FIG. 2 shows a schematic cross section of two plates after glue strips have been applied to the latter in the known manner, the glue pattern being shown.

Apart from the glue stations 3', 3" the schematic representation of FIG. 1 is also applicable to known methods for the production of honeycomb cores. How the glue pattern according to the prior art will look like for a honeycomb core to be made with cells with an adhering side of 12 mm and a length $h_1$ (the largest distance between two consecutive plates) of 37 mm, is shown in FIG. 2. In an alternative embodiment the adhering side and the length $h_1$ are 11 mm and 25 mm, respectively. On the top paper plate W1 with a thickness of 0,2 mm glue strips 20 are applied which have a nominal width b1 of 11 mm and are spaced at an interspace b2 of twice a bridging side and once an adhering side, in this case 74 mm. On the paper plate W2 (also 0,2 mm thick) glue strips 21 are applied which are likewise 11 mm wide and are spaced at a distance of 74 mm. When the plates W1 and W2 are pressed together, the glue strip will expand laterally somewhat and the plate W1 will be glued over strips of approximately 12 mm in width to the lower side of the plate W1. When the plates W1 and W2 are included in the plate stack, and are then pulled apart in the directions X, the plates W1 and W2 will thus remain glued to each other at the location of the glue strip, thus over an area of 12 mm, and the adjacent parts will rotate relatively in directions $T_1$ $T_2$ and then form the inclined bridging sides of the honeycomb cells. This has been shown schematically in an exaggerated way with broken lines.

Figure 3:
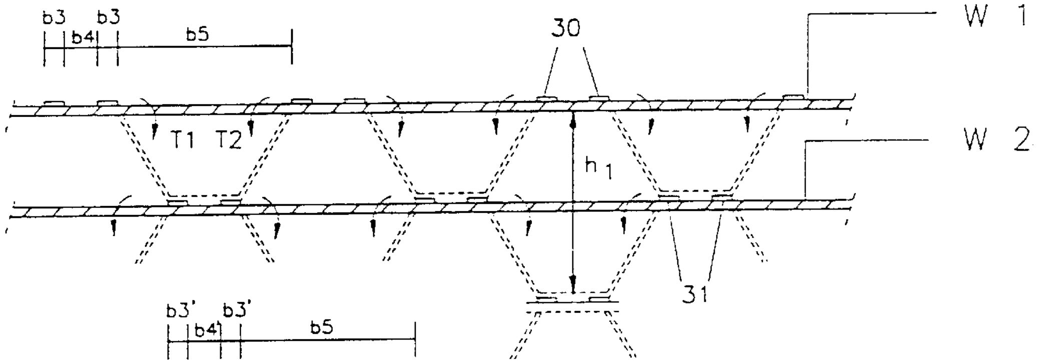
FIG. 3 shows a schematic cross section corresponding to that of FIG. 2 of two plates which are provided in accordance with the invention with glue tracks and are intended for the formation of a honeycomb core.

In FIG. 3 a representation is given which likens that of FIG. 2, but, in addition, in accordance with the invention each glue strip is replaced by one pair of glue tracks 30, which have a width b3 of 3 mm and are spaced at an interspacing b4 of 5 mm. The glue tracks of adjacent adhering sides are again at a mutual distance b5 of 74 mm. On the plate W2 similar glue tracks 31 are applied, however in a centrally staggered manner. The glue tracks nearest each other in a horizontal sense which are located at different plates, are at a mutual distance which is equal to the corresponding distance in the glue pattern according to FIG. 2. After pressing the glue tracks are each widened on both sides to 4 mm wide tracks, with an interspacing of 4 mm. When W1 and W2 with the glue pattern of FIG. 3 are pulled away from each other, the same effect is achieved as in FIG. 2. At the location of the glue tracks 31 the plates W1 and W2 are kept attached to each other, the areas located between the glue tracks of successive plates W1 and W2 again forming the inclined sides of the honeycomb cells. However, this same effect is achieved with much less glue.

Figure 4:
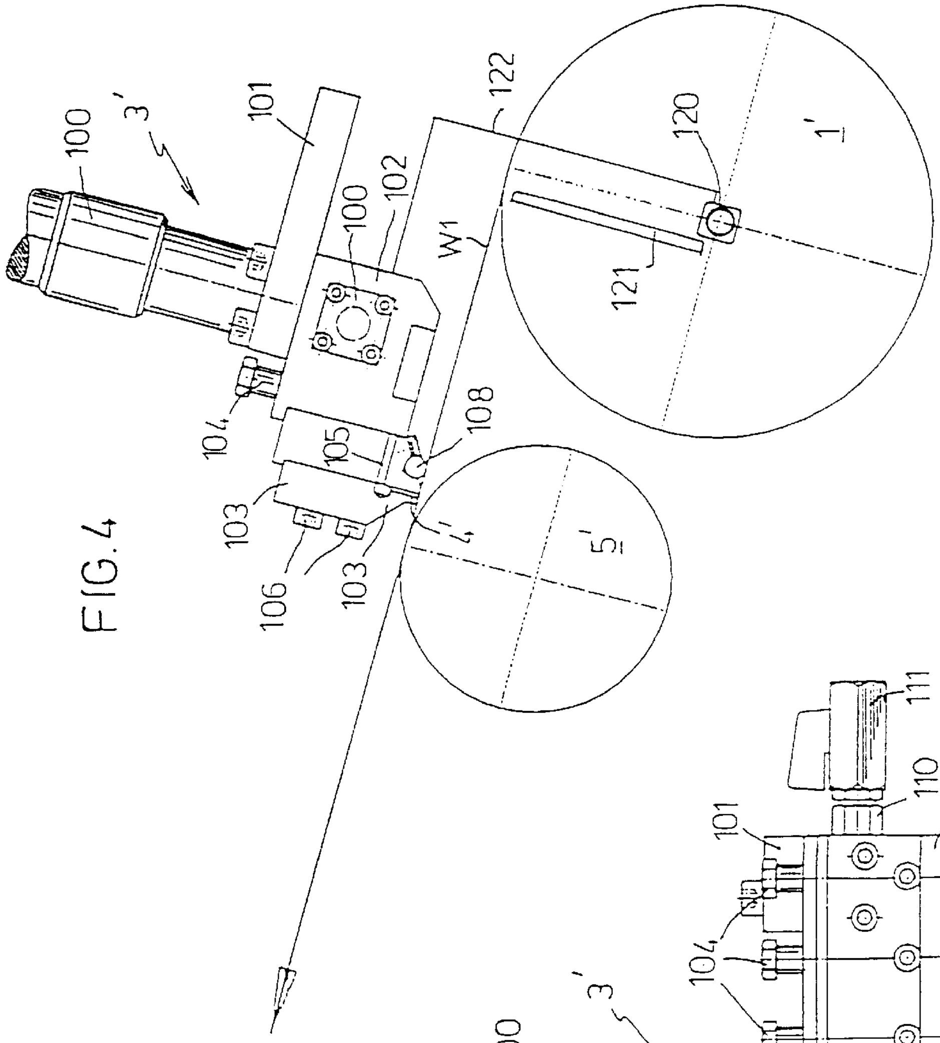
FIG. 4 shows a schematic reproduction of a part of the glue station which is used in the method according to the invention.
Figure 4A:
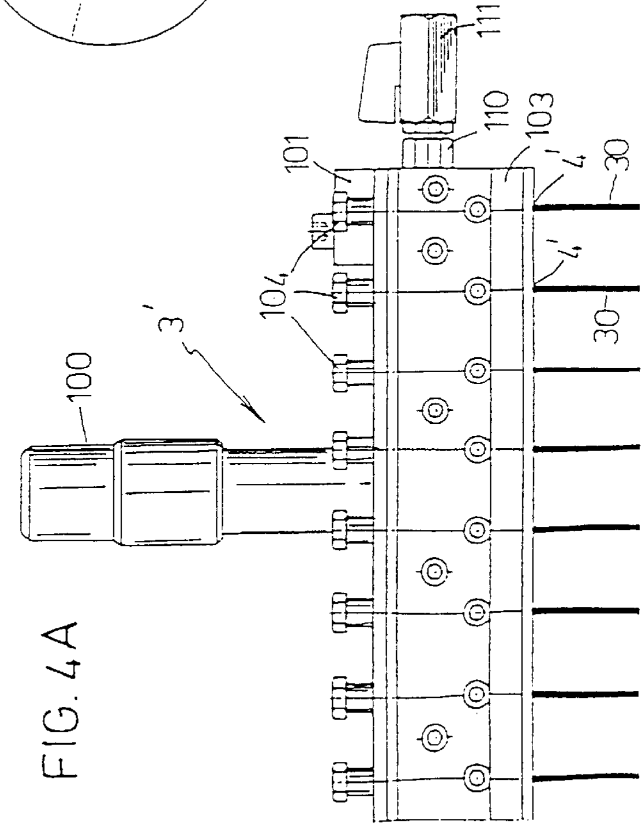
FIG. 4A shows a view of a part of the glue station of FIG. 4.

In FIGS. 4 and 4A a schematic side view is shown of a possible embodiment of the glue station 3' (and glue station 3", not shown) . The glue station 3', of which a part which forms a group of glue spout nozzles is shown here, is arranged above the web W1 which is rolled off roller 1' in the direction shown by the arrow. Downstream from the glue station 3' the web W1 is supported by a roller 5'.

The glue station 3' is suspended in a fixed frame, not shown, by means of bars 101 and contains a glue supply tube 100, which leads to a distribution chamber 102. The distribution chamber 102 is provided with a horizontal series of outlets, not shown, which connect to separate glue supply channels 105 feeding glue from the chamber 102 to glue spout nozzles 4', which are formed in the glue block 103, which is attached in such a way onto the chamber 102 by means of screw bolts that no glue can leak out.

On the top side of the glue chamber 102 there are closing screws 104, with which the passage opening of the chamber 102 to the glue channel 105 concerned can be opened or closed. Because of this, adjustment can be made to the width of the plates which are being processed.

The web W1 is pushed up somewhat by the roller 5', so that the top surface of the web W1 abuts the spout nozzle openings with slight pressure. Upstream from there the glue station is provided with a fixed steel bar 108 for guiding the paper web along the spout nozzles to keep the contact pressure as minimal as possible.

The roller 1' is provided with an angular velocity meter 120 and a supply meter 121. The data of both of these is delivered via data line 122 to control means, not shown, in the glue station 3', which can regulate the supply pressure of the glue in response to those data.

The glue station 3' is composed of a number of the groups shown. Each group can contain 16 glue spout nozzles and can have a width of 420 mm.

On the side the glue group shown in FIG. 4A is provided with a connection 110 with valve 111, on to which a tube for a cleaning agent can be connected.

I claim:

1. A method for forming a honeycomb-shaped core suitable for being included in a honeycomb panel, wherein webs or plates of deformable material are provided with continuously or otherwise extending glue strips, wherein, for every two plates or webs to be mounted onto each another, said glue strips are disposed in a laterally regularly mutually staggered manner on faces thereof having the same orientation and wherein the plates or webs are pressed onto each other in order to allow them to adhere to each other locally wherein the glue strips are applied by means of glue spout nozzles, wherein the glue strips each comprise two glue tracks which are laterally spaced and are kept spaced with their opposing longitudinal edges at a distance in the order of magnitude of a width of a side of a honeycomb cell.

2. Method according to claim 1, wherein the glue tracks of a glue strip are spaced at a lateral intermediate interspacing in the order of magnitude of the width of the glue tracks.

3. Method according to claim 1, wherein the thickness of the glue tracks in a lateral direction is approximately 2 to 4 mm.

4. Method according to claim 1, wherein one of the glue tracks is laid on one plate or web and the other on the plate or web to be pressed thereon.

5. Method according to claim 1, wherein a plurality of plates is assembled in a stack, said stack is compressed and is then cut into a plurality of stacks of bands, wherein each of said tracks is extendable to form a honeycomb core.

6. Method according to claim 1, wherein the deformable material is a cellulose material.

7. Method according to claim 6, wherein said cellulose material is a paper material.

8. Method according to claim 6, wherein said cellulose material is a cardboard material.

9. Method according to claim 1 wherein the glue tracks are applied onto webs, said webs being cut into plates after being pressed onto each other, consecutive plates being assembled in a stack, said stack being compressed and then cut into a plurality of stacks of bands, which each are extendable to form a honeycomb core.

10. Apparatus for use for forming a honeycomb-shaped core suitable for being included in a honeycomb panel, said core being composed of an expanded stack of bands of deformable material, said stack of bands being cut from a stack of plates of said deformable material, said plates being adhered to each other by means of glue strips applied on said plates, the apparatus comprising a conveyor for said plates and a glue station located above the conveyor for said plates, said glue station being provided with a series of glue spout nozzles arranged laterally adjacent one another and a primary glue supply means therefor, in which the glue spout nozzles are connected to the primary glue supply means in groups via secondary glue supply means, in which the secondary glue supply means are provided with selectively operable valves for passing glue.

11. Apparatus according claim 10, in which the primary glue supply means is provided with a selectively operable glue pressure regulator.

12. Apparatus according to claim 11, further comprising a means for measuring the velocity of the plates carried past the glue station, wherein the glue pressure regulator is operable in response to the measuring data of the velocity measuring means.

13. Apparatus according to claim 11, in which within each group of glue spout nozzles the glue spout nozzles are connected to the secondary glue supply means via tertiary glue supply means, in which the tertiary glue supply means are formed as a series of glue supply tubes, which are parallely arranged and are at least almost of mutually equal dimensions.

* * * * *